United States Patent [19]

Lee

[11] Patent Number: 5,398,070
[45] Date of Patent: Mar. 14, 1995

[54] SMELL EMISSION CONTROL APPARATUS FOR TELEVISION RECEIVER

[75] Inventor: Dong H. Lee, Daeku, Rep. of Korea

[73] Assignee: Goldstar Co., Ltd., Seoul, Rep. of Korea

[21] Appl. No.: 132,318

[22] Filed: Oct. 6, 1993

[30] Foreign Application Priority Data

Oct. 6, 1992 [KR] Rep. of Korea ............... 18261/1992

[51] Int. Cl.⁶ .................... H04N 5/445; H04N 7/087
[52] U.S. Cl. .................... 348/553; 348/460; 348/478
[58] Field of Search ................. 358/142, 146, 147, 93, 358/83, 1, 22, 143, 188; H04N 5/445, 5/50, 7/087, 7/08, 5/262; 348/460, 473, 474, 478, 476, 477, 479, 461, 465, 467, 553, 563, 564, 569, 570, 734, 725, 61, 121, 578

[56] References Cited

U.S. PATENT DOCUMENTS

| | | | |
|---|---|---|---|
| 2,540,144 | 2/1951 | Stern | 358/142 |
| 3,585,991 | 6/1971 | Balamuth | 358/83 |
| 4,667,235 | 5/1987 | Nozoe et al. | 358/147 |
| 4,771,344 | 9/1988 | Fallacaro et al. | 358/93 |
| 4,952,024 | 8/1990 | Gale | 358/88 |
| 5,234,346 | 8/1993 | Rice | 358/88 |
| 5,253,051 | 10/1993 | McManigal | 358/93 |

FOREIGN PATENT DOCUMENTS 4248784 9/1992 Japan ............... H04N 7/08

Primary Examiner—James J. Groody
Assistant Examiner—Safet Metjahic

[57] ABSTRACT

A television receiver includes structure for receiving video and audio signals in addition to a transmission section for converting a composite signal in which a video signal and a smell signal are mixed. The smell signal is generated at an amplifier of a TV camera. The television receiver includes a detection circuit for sensing the smell signal. Upon sensing the smell signal, the smell signal can be used for actuating a plurality of smells located in separate smell emitting devices. These emitting devices include, for example, a heating plate and a fan which upon actuation causes perfume in the emitting device to be emitted. This device is then defused into, for example, a room and the smell matches a picture shown on the CRT. This enables a viewer to not only hear and see the picture from a television but also to sense smell related to the contents of the displayed picture.

3 Claims, 5 Drawing Sheets

FIG. 4
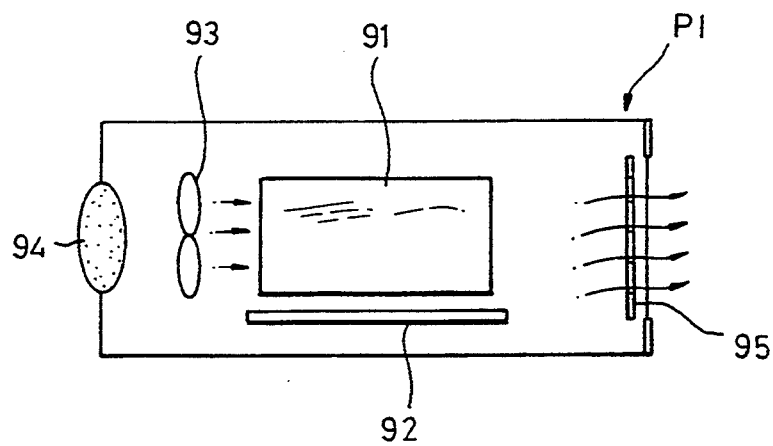
FIG. 5
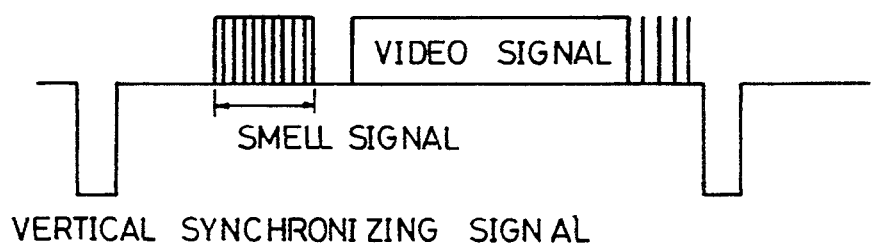
VERTICAL SYNCHRONIZING SIGNAL
FIG. 6
| CLOCK | SMELL SELECT DATA | SMELL INTEN-SITY DATA | OTHER 1 | OTHER 2 |

FIG. 7

```
0000  0000    NATURE
0000  0001    ROSE
0000  0010    TULIP
0000  0011    BULGOGI
 ⋮     ⋮        ⋮
1111  1111    SEA
```

FIG. 8

```
0000  0000    NO EMISSION
0000  0001    VERY WEAK
0000  0010    WEAK
              ⋮
1111  1111    VERY STRONG
```

FIG. 9

| SMELL SELECT DATA | HEAT DRIVE DATA | FAN DRIVE DATA | OTHERS | ------ |

SMELL EMISSION CONTROL APPARATUS FOR TELEVISION RECEIVER

BACKGROUND OF THE INVENTION

1. Field of the Invention

The present invention relates in general to television receivers, and more particularly to a smell emission control apparatus for a television receiver in which a smell is emitted from the television receiver corresponding to the contents of a picture which is displayed on a screen of the television receiver.

2. Description of the Prior Art

A conventional television receiver receives video and audio signals which are electrically transmitted from a broadcasting station and then restores the received video and audio signals to the original states. The restored video and audio signals are outputted through a Braun tube and a speaker of the television receiver, respectively.

Referring to FIG. 1, there is shown a block diagram of conventional television transmitter and receiver. As shown in this drawing, the conventional television transmitter comprises a camera 1 for providing a video signal, a mike 2 for providing an audio signal, an amplifier 3 for amplifying the video and audio signals from the camera 1 and the mike 2, and a transmitter 4 for converting the amplified video and audio signals from the amplifier 3 into electrical signals and transmitting the converted electrical signals.

The conventional television receiver comprises a tuner 6 for receiving the electrical signals transmitted from the transmitter 4 through an antenna 5, a detection circuit 7 for detecting video and audio intermediate frequency components from an output of the tuner 6 to extract the video and audio signals being placed on video and audio intermediate frequencies, respectively, an infrared-ray signal receiver 8 for receiving an infrared-ray signal from a remote controller 15 and outputting a mode signal corresponding to the received infrared-ray signal, and a key matrix unit 9 for outputting a mode signal according to a user's selection.

Also, the conventional television receiver comprises a microprocessor 10 for outputting a control signal to perform a mode corresponding to the mode signal from the infrared-ray receiver 8 or from the key matrix unit 9.

Audio signal amplification and output circuits 11 and 12 are adapted to amplify the audio signal from the detection circuit 7, wave-shape the amplified audio signal and output the resultant audio signal through a speaker SP in response to the control signal from the microprocessor 9.

Video signal processing and output circuits 13 and 14 are adapted to process the video signal from the detection circuit 7, wave-shape the processed video signal and output the resultant video signal through a Braun tube CRT in response to the control signal from the microprocessor 9.

The operation of the conventional television transmitter and receiver with the above-mentioned constructions will hereinafter be described.

In the television transmitter, the video and audio signals from the camera 1 and the mike 2 are amplified by the amplifier 3 and then converted into the electrical signals by the transmitter 4. The electrical signals from the transmitter 4 are transmitted by radio to the television receiver.

In the television receiver, in response to the mode signal from the infrared-ray receiver 8 or from the key matrix unit 9, the microprocessor 10 outputs the control signal to perform the corresponding mode. For example, upon receiving a channel select mode signal from the infrared-ray receiver 8 or from the key matrix unit 9, the microprocessor 10 applies the control signal to the tuner 6 to select a frequency signal corresponding to a channel selected by the user. The selected frequency signal from the tuner 6 is applied to the detection circuit 7.

The detection circuit 7 detects the video and audio intermediate frequency components from the frequency signal from the tuner 6 to extract the video and audio signals being placed on the video and audio intermediate frequencies, respectively. The extracted audio signal from the detection circuit 7 is amplified by the audio signal amplification circuit 11 and then wave-shaped by the audio signal output circuit 12 under the control of the microprocessor 10. As a result, the resultant audio signal from the audio signal output circuit 12 is outputted through the speaker SP.

In response to the control signal from the microprocessor 10, the video signal processing circuit 13 processes the extracted video signal from the detection circuit 7 to output a color difference signal. The color difference signal from the video signal processing circuit 11 is wave-shaped by the video signal output circuit 14. As a result, the resultant video signal from the video signal processing circuit 14 is outputted through the Braun tube CRT.

For example, upon receiving an on-screen display (OSD) mode signal from the infrared-ray receiver 8 or from the key matrix unit 9, the microprocessor 10 outputs the control signal to perform the corresponding mode. In response to the control signal from the microprocessor 10, the video signal processing circuit 13 switches the color difference signal to a red (R), green (G) and blue (B) color signal for the OSD mode. The R, G and B color signal from the video signal processing circuit 11 is wave-shaped by the video signal output circuit 14. As a result, the resultant video signal from the video signal processing circuit 14 is outputted through the Braun tube CRT.

However, the conventional television receiver is desirable to satisfy the sense of sight and the sense of hearing of the user by outputting the video and audio signals through the Braun tube and the speaker, but has the disadvantage that it cannot satisfy the sense of smell of the user. For this reason, the user cannot feel more actually the contents of a picture which is displayed on a screen of the Braun tube.

SUMMARY OF THE INVENTION

Therefore, the present invention has been made in view of the above problem, and it is an object of the present invention to provide a smell emission control apparatus for a television receiver in which a smell is emitted from the television receiver corresponding to the contents of a picture which is displayed on a screen of the television receiver, to satisfy the sense of smell as well as the sense of sight and the sense of hearing of the user, so that the user can feel more actually the contents of the displayed picture.

In accordance with the present invention, the above and other objects can be accomplished by a provision of a smell emission control apparatus for a television receiver comprising transmission means for converting a composite signal in which a video signal and a smell signal are mixed and an audio signal into electrical signals and transmitting the converted electrical signals, said transmission means having a camera, a mike, smell signal generation means, an amplifier and a transmitter, said camera providing the video signal, said mike providing the audio signal, said smell signal generation means providing the smell signal, said amplifier amplifying the audio signal from said mike and the composite signal in which the video signal from said camera and the smell signal from said smell signal generation means are mixed, said transmitter converting the amplified audio and composite signals from said amplifier into the electrical signals and transmitting the converted electrical signals by radio; and reception means for converting the electrical signals transmitted from said transmission means into the video, audio and smell signals and outputting the converted video, audio and smell signals through a Braun tube, a speaker and a corresponding one of a plurality of smell emission devices.

BRIEF DESCRIPTION OF THE DRAWINGS

The above and other objects, features and advantages of the present invention will be more clearly understood from the following detailed description taken in conjunction with the accompanying drawings, in which:

FIG. 4 is a side sectional view of a smell emission device in the apparatus in FIG. 2;

FIG. 5 is a waveform diagram of a composite signal in accordance with the present invention;

FIG. 6 is a view illustrating a data format of a smell signal from a smell signal generator in the apparatus in FIG. 2;

FIG. 7 is a view illustrating a format of smell select data of the smell signal in accordance with the present invention;

FIG. 8 is a view illustrating a format of smell intensity data of the smell signal in accordance with the present invention; and FIG. 9 is a view illustrating a format of data from a smell signal processing circuit in the apparatus in FIG. 2.

DETAILED DESCRIPTION OF THE PREFERRED EMBODIMENT

Figure 1:
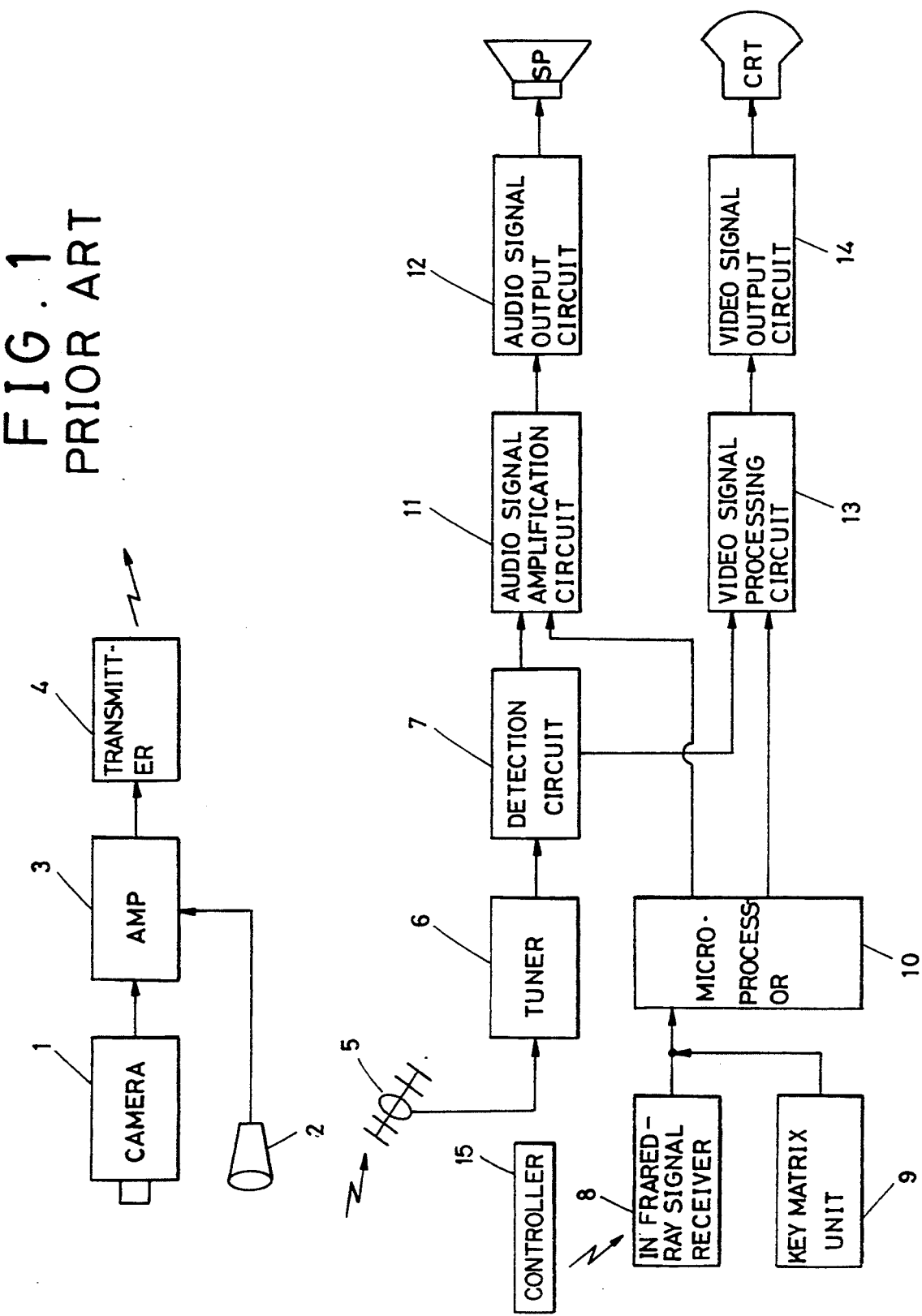
FIG. 1 is a block diagram of conventional television transmitter and receiver.
Figure 2:
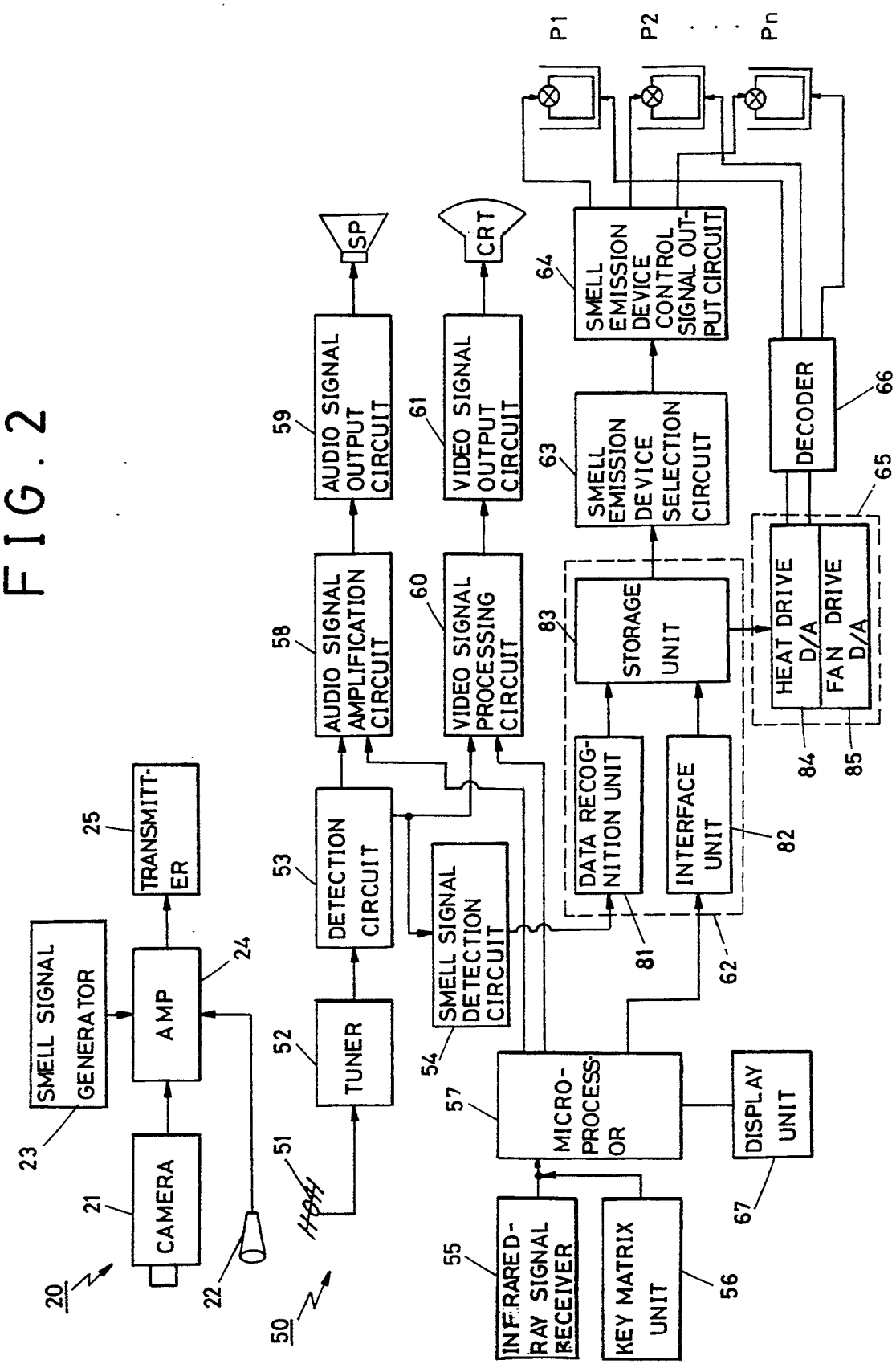
FIG. 2 is a block diagram of a smell emission control apparatus for a television receiver in accordance with the present invention.

Referring to FIG. 2, there is shown a block diagram of a smell emission control apparatus for a television receiver in accordance with the present invention. As shown in this drawing, the smell emission control apparatus of the present invention comprises a transmission section 20 for converting a composite signal in which a video signal and a smell signal are mixed and an audio signal into electrical signals and transmitting the converted electrical signals, and a reception section 50 for converting the electrical signals transmitted from the transmission section 20 into the video, audio and smell signals and outputting the converted video, audio and smell signals through a Braun tube, a speaker and a corresponding one of a plurality of smell emission devices.

The transmission section 20 comprises a camera 21 for providing the video signal, a mike 22 for providing the audio signal, a smell signal generator 23 for providing the smell signal, an amplifier 24 for amplifying the audio signal from the mike 22 and the composite signal in which the video signal from the camera 21 and the smell signal from the smell signal generator 23 are mixed, and a transmitter 25 for converting the amplified audio and composite signals from the amplifier 24 into the electrical signals and transmitting the converted electrical signals.

The reception section 50 comprises a tuner 52 for receiving the electrical signals transmitted from the transmission section 20 through an antenna 51 and converting the received electrical signals into the audio signal and the composite signal in which the video and smell signals are mixed, a detection circuit 53 for detecting composite and audio intermediate frequency components from an output of the tuner 52 to extract the composite and audio signals being placed on composite and audio intermediate frequencies, respectively, and a smell signal detection circuit 54 for detecting the smell signal from the composite signal from the detection circuit 53.

The reception section 50 also comprises an infrared-ray signal receiver 55 for receiving an infrared-ray signal from a remote controller and outputting a mode signal corresponding to the received infrared-ray signal, a key matrix unit 56 for outputting a mode signal according to a user's selection, and a microprocessor 57 for outputting a control signal to perform a mode corresponding to the mode signal from the infrared-ray receiver 55 or from the key matrix unit 56.

Audio signal amplification and output circuits 58 and 59 are provided in the reception section 50 to amplify the audio signal from the detection circuit 53, wave-shape the amplified audio signal and output the resultant audio signal through the speaker SP in response to the control signal from the microprocessor 57.

Video signal processing and output circuits 60 and 61 are also provided in the reception section 50 to process the video signal of the composite signal from the detection circuit 53, wave-shape the processed video signal and output the resultant video signal through the Braun tube CRT in response to the control signal from the microprocessor 57.

A smell signal processing circuit 62 is responsive to the control signal from the microprocessor 57 to process the smell signal from the smell signal detection circuit 54 so as to output smell select data, smell intensity data, fan drive data and heat drive data necessary to the smell emission. The smell select data indicates a kind of a smell to be emitted, the smell intensity data indicates an intensity of the smell to be emitted, and the fan drive data and the heat drive data indicate the time of the smell to be emitted.

Also, the reception section 50 comprises a smell emission device selection circuit 63 for selecting one of the plurality of smell emission devices P1-Pn in response to the smell select data from the smell signal processing circuit 62, a smell emission device control signal output circuit 64 for outputting a control signal in response to the smell intensity data from the smell signal processing circuit 62 to drive the smell emission device selected by the smell emission device selection circuit 68, a heat generation circuit 65 for outputting fan and heat drive signals in response to the fan and heat drive data from the smell signal processing circuit 62, and a decoder 66 for decoding the fan and heat drive signals from the heat generation circuit 65 and outputting the decoded signals to the smell emission device selected by the smell emission device selection circuit 63.

Each of the smell emission devices P1–Pn is adapted to emit the corresponding smell in response to the control signal from the smell emission device control signal output circuit 64 and the output signals from the decoder 66.

A smell indicator 67 is connected to the microprocessor 57 to indicate that A selected smell is in emission.

Figure 3:
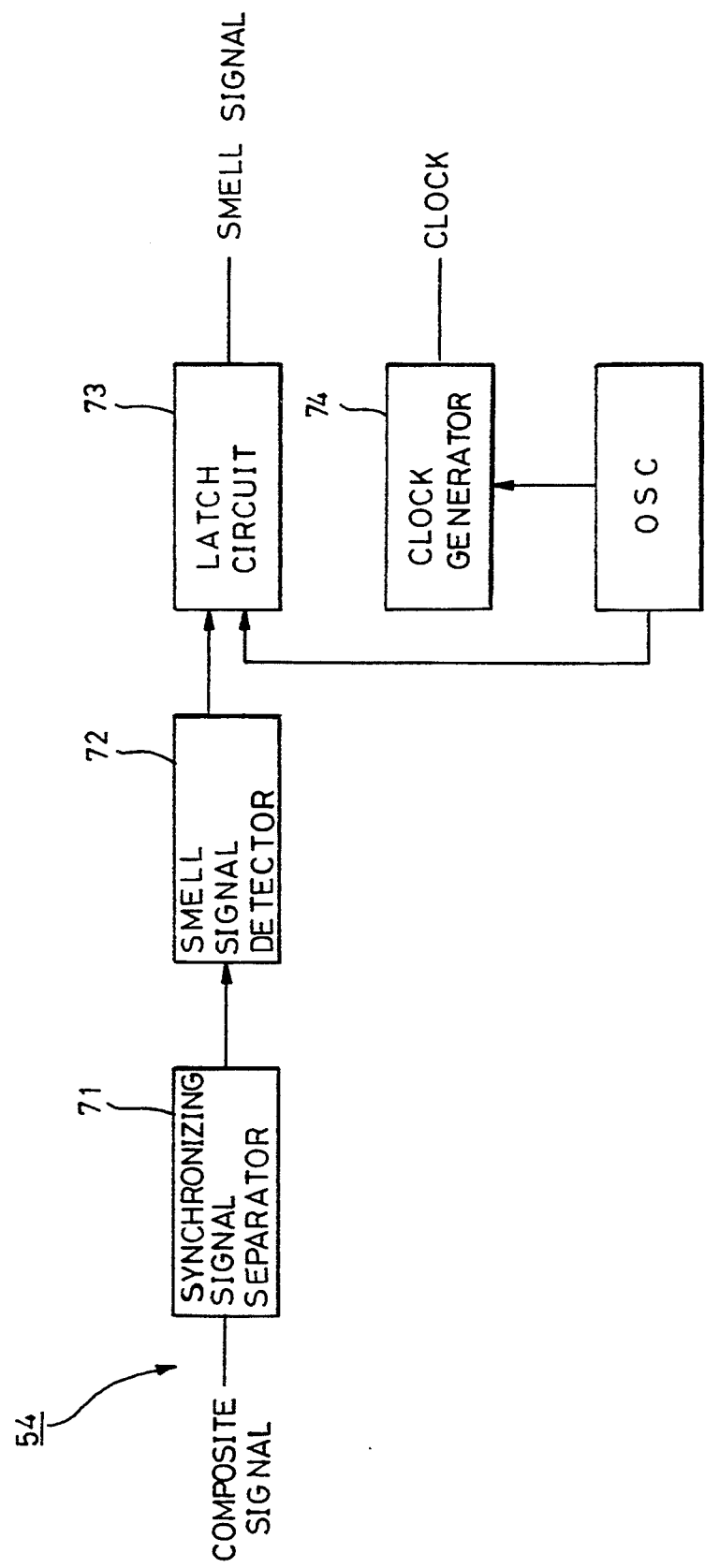
FIG. 3 is a block diagram of a smell signal detection circuit in the apparatus in FIG. 2.

Referring to FIG. 3, there is shown a block diagram of the smell signal detection circuit 54 in the apparatus in FIG. 2. As shown in this figure the smell signal detection circuit 54 includes a synchronizing signal separator 71 for separating a vertical synchronizing signal from the composite signal from the detecting circuit 53, a smell signal detector 72 for detecting the smell signal being present in a vertical blanking interval of the vertical synchronizing signal from the synchronizing signal separator 71, an oscillator OSC for generating a reference clock, a latch circuit 73 for latching the smell signal from the smell signal detector 72 for a predetermined time period in response to the reference clock from the oscillator OSC, and a clock generator 74 for generating a clock for the process of the smell signal in response to the reference clock from the oscillator OSC.

Turning to FIG. 2 the smell signal processing circuit 62 includes a data recognition unit 81 for reading the smell select data, the smell intensity data, the fan drive data and the heat drive data from the smell signal from the smell signal detection circuit 54 in response to the clock from the smell signal detection circuit 54, an interface unit 82 for outputting a drive signal in response to the control signal from the microprocessor 57, and a storage unit 83 for storing the smell select data, the smell intensity data, the fan drive data and the heat drive data from the data recognition unit 81 in response to the drive signal from the interface unit 82.

The heat generation circuit 65 includes a heat drive digital/analog (D/A) converter 84 for converting the heat drive data from the storage unit 83 in the smell signal processing circuit 62 into an analog signal and outputting the converted analog signal as the heart drive signal to the decoder 66, and a fan drive D/A converter 85 for converting the fan drive data from the storage unit 83 into an analog signal and outputting the converted analog signal as the fan drive signal to the decoder 66.

The smell emission device selection circuit 63 may include a switch for selecting one of the plurality of smell emission devices P1–Pn in response to the smell select data from the smell signal processing circuit 62.

Referring to FIG. 4, there is shown a side sectional view of each of the smell emission devices P1–Pn in the apparatus in FIG. 2. As shown in this drawing, each of the smell emission devices P1–Pn includes a container 91 for containing a concentrated perfume therein, a heat plate 92 disposed under the container 91 to heat the container 91 in response to the decoded heat drive signal from the decoder 66 so as to allow A smell to be emitted from the concentrated perfume in the container 91, a suction port 94 disposed at the front of the container 91 to suck external air, a fan 93 disposed between the suction port 94 and the container 91 to blow the air sucked through the suction port 94 to the container 91 in response to the decoded fan drive signal from the decoder 66 so as to allow the smell to be rapidly emitted from the concentrated perfume in the container 91 or remove the emitted smell, and a discharge port 95 disposed at the rear of the container 91 to discharge the smell emitted from the concentrated perfume in the container 91 externally.

The operation of the smell emission control apparatus with the above-mentioned construction in accordance with the present invention will hereinafter be described in detail with reference to FIGS. 2 to 9.

In the transmission section 20, the audio signal from the mike 22 and the composite signal in which the video signal from the camera 21 and the smell signal from the smell signal generator 23 are mixed are amplified by the amplifier 24 and then converted into the electrical signals by the transmitter 25. The electrical signals from the transmitter 25 are transmitted to the reception section 50. Here, the smell signal from the smell signal generator 23 is transmitted, being placed in the vertical blanking interval of the composite signal.

In the reception section 50, in response to the mode signal from the infrared-ray receiver 55 or from the key matrix unit 56, the microprocessor 57 outputs the control signal to perform the corresponding mode. For example, upon receiving a channel select mode signal from the infrared-ray receiver 55 or from the key matrix unit 56, the microprocessor 57 applies the control signal to the tuner 52 to select a frequency signal corresponding to a channel selected by the user. The selected frequency signal from the tuner 52 is applied to the detection circuit 53.

The detection circuit 53 detects the composite and audio intermediate frequency components from the frequency signal from the tuner 52 to extract the composite and audio signals being placed on the composite and audio intermediate frequencies, respectively The extracted audio signal from the detection circuit 53 is amplified by the audio signal amplification circuit 58 and then wave-shaped by the audio signal output circuit 59 under the control of the microprocessor 57. As a result, the resultant audio signal from the audio signal output circuit 59 is outputted through the speaker SP.

On the other hand, the composite signal from the detection circuit 53 is applied to the smell signal detection circuit 54. Upon receiving the composite signal from the detection circuit 53, the smell signal detection circuit 54 detects the smell signal being present in the vertical blanking interval of the vertical synchronizing signal of the received composite signal. Namely, as shown in FIG. 5, in the smell signal detection circuit 54, the vertical synchronizing signal is separated from the composite signal from the detecting circuit 53 by the synchronizing signal separator 71. Then, the smell signal detector 72 detects the smell signal being present in the vertical blanking interval of the vertical synchronizing signal from the synchronizing signal separator 71.

The smell signal detected by the smell signal detection circuit 54 contains the smell select data, the smell intensity data, the fan drive data and the heat drive data necessary to the smell emission as shown in FIG. 6. The smell select data indicates the kind of the smell to be emitted, the smell intensity data indicates the intensity of the smell to be emitted, and the fan drive data and the heat drive data indicate the time of the smell to be emitted. As shown in FIG. 7, for example, the smell select data indicates the smell of nature when it is 0000 0000 in format and the smell of rose when it is 0000 0001 in format. For example, the smell intensity data indicates no emission of the smell when it is 0000 0000 in format and a very weak emission of the smell when it is 0000 0001 in format. Also, the smell intensity data indicates a very strong emission of the smell when it is 1111 1111 in format.

Also in the smell signal detection circuit 54, the oscillator generates the reference clock and the clock generator 74 generates the clock for the process of the smell signal in response to the reference clock from the oscillator OSC. As a result, the smell signal detection circuit 54 outputs the smell signal together with the clock.

On the other hand, in response to the control signal from the microprocessor 10, the video signal processing circuit 60 processes the video signal of the composite signal from the detection circuit 53 to output a color difference signal. The color difference signal from the video signal processing circuit 60 is wave-shaped by the video signal output circuit 61. As a result, the resultant video signal from the video signal processing circuit 61 is outputted through the Braun tube CRT.

For example, upon receiving an OSD mode signal from the infrared-ray receiver 55 or from the key matrix unit 56, the microprocessor 57 outputs the control signal to perform the corresponding mode. In response to the control signal from the microprocessor 57, the video signal processing circuit 60 switches the color difference signal to a R, G and B color signal for the OSD mode. The R, G and B color signal from the video signal processing circuit 60 is wave-shaped by the video signal output circuit 61. As a result, the resultant video signal from the video signal processing circuit 61 is outputted through the Braun tube CRT.

The smell signal and the clock from the smell signal detection circuit 54 are applied to the smell signal processing circuit 62 under the control of the microprocessor 57. In response to the control signal from the microprocessor 57, the smell signal processing circuit 62 processes the smell signal from the smell signal detection circuit 54 to output the smell select data, the smell intensity data, the fan drive data and the heat drive data necessary to the smell emission. Namely, in the smell signal processing circuit 62, the data recognition unit 81 reads the smell select data, the smell intensity data, the fan drive data and the heat drive data from the smell signal from the smell signal detection circuit 54 in response to the clock from the smell signal detection circuit 54. Then, the read data from the data recognition unit 81 are stored as shown in FIG. 9 in the storage unit 83 in response to the drive signal from the interface unit 82 under the control of the microprocessor 10. The smell select data from the storage unit 83 is applied to the smell emission device selection circuit 63 and the heat and fan drive data therefrom are applied to the heat generation circuit 65. Also, the smell intensity data from the storage unit 83 is applied to the smell emission device control signal output circuit 64.

The smell emission device selection circuit 63 selects one of the plurality of smell emission devices P1–Pn in response to the smell select data from the storage unit 83.

In the heat generation circuit 65, the heat drive D/A converter 84 converts the heat drive data from the storage unit 83 into the analog signal and outputs the converted analog signal as the heat drive signal to the decoder 66. Also, the fan drive D/A converter 85 converts the fan drive data from the storage unit 83 into the analog signal and outputs the converted analog signal as the fan drive signal to the decoder 66. Here, the heat and fan drive signals may be power sources to the heat plate 92 and the fan 94 in the selected smell emission device, respectively.

The heat and fan drive signals from the heat generation circuit 65 are applied through the decoder 66 to the heat plate 92 and the fan 94 in the selected smell emission device, respectively. In response to the heat drive signal from the decoder 66, the heat plate 92 heats the container 91, thereby causing the smell to be emitted from the concentrated perfume in the container 91. Also, in response to the fan drive signal from the decoder 66, the fan 93 blows the air sucked through the suction port 94 to the container 91. As a result, the smell from the concentrated perfume is emitted through the discharge port 95 and then diffused in the room. At this time, the discharge port 95 is opened in response to the control signal from the smell emission device control signal output circuit 64 so that the smell from the concentrated perfume is rapidly diffused in the room. Thereafter, when the smell is sufficiently diffused in the room and a picture on a screen of the Braun tube CRT is then changed, the previous smell is removed and a new one is emitted corresponding to the contents of the changed picture.

As apparent from the above description, according to the present invention, the smell can be emitted from the television receiver corresponding to the contents of the picture which is displayed on the screen of the television receiver so as to satisfy the sense of smell as well as the sense of sight and the sense of hearing of the user. Therefore, the user can feel more actually the contents of the displayed picture.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A smell emission control apparatus for a television receiver comprising:

transmission means for converting a composite signal in which a video signal and a smell signal are mixed and an audio signal into electrical signals and transmitting the converted electrical signals, said transmission means having a camera, a mike, smell signal generation means, an amplifier and a transmitter, said camera providing the video signal, said mike providing the audio signal, said smell signal generation means providing the smell signal, said amplifier amplifying the audio signal from said mike and the composite signal in which the video signal from said camera and the smell signal from said smell signal generation means are mixed, said transmitter converting the amplified audio and composite signals from said amplifier into the electrical signals and transmitting the converted electrical signals;

reception means for converting the electrical signals transmitted from said transmission means into video, audio and smell signals and outputting the video, audio and smell signals through a Braun tube, a speaker and a corresponding one of a plurality of smell emission devices;

tuning means for receiving the electrical signals transmitted from said transmission means through an antenna and converting the received electrical signals into the audio signal and the composite signal in which the video and smell signals are mixed;

detection means for detecting composite and audio intermediate frequency components from an output of said tuning means to extract the composite and audio signals being placed on composite and audio intermediate frequencies, respectively;

smell signal detection means for detecting the smell signal from the composite signal from said detection means;

infrared-ray signal reception means for receiving an infrared-ray signal from a remote controller and outputting a mode signal corresponding to the received infrared-ray signal;

key matrix means for outputting a mode signal according to a user's selection;

control means, including a microcomputer, for outputting a control signal to perform a mode corresponding to a mode signal from said infrared-ray receiver or from said key matrix unit;

audio signal amplification and output means for amplifying the audio signal from said detection means, wave-shaping the amplified audio signal and outputting the resultant audio signal through the speaker in response to the control signal from said control means; and means for generating and emitting a smell according to the control signal from said microcomputer and from said smell signal detection means;

wherein said smell signal generating and emitting means further comprises:

smell signal processing means responsive to the control signal from said control means for processing the smell signal from said smell signal detection means to output smell select data, smell intensity data, fan drive data and heat drive data necessary to the smell emission, the smell select data indicating a kind of a smell to be emitted, the smell intensity data indicating an intensity of the smell to be emitted, the fan drive data and the heat drive data indicating the time of the smell to be emitted;

smell emission device selection means for selecting one of the plurality of smell emission devices in response to the smell select data from said smell signal processing means;

smell emission device control signal output means for outputting a control signal in response to the smell intensity data from said smell signal processing means to drive the smell emission device selected by said smell emission device selection means;

heat generation means for outputting fan and heat drive signals in response to the fan and heat drive data from said smell signal processing means;

decoding means for decoding the fan and heat drive signals from said heat generation means and outputting the decoded signals to the smell emission device selected by said smell emission device selection means;

each of said smell emission devices emitting a corresponding smell in response to the control signal from said smell emission device control signal output means and the output signals from said decoding means; and wherein each of said smell emission devices includes:

a container for containing a concentrated perfume therein;

a heat plate disposed under said container, said heat plate heating said container in response to the decoded heat drive signal from said decoding means to allow a smell to be emitted from the concentrated perfume in said container;

a suction port disposed at the front of said container, said suction port sucking external air;

a fan disposed between said suction port and said container, said an blowing the air sucked through said suction port to said container in response to the decoded fan drive signal from said decoding means to allow the smell to be rapidly emitted from the concentrated perfume in said container or remove the emitted smell; and a discharge port disposed at the rear of said container, said discharge port discharging the smell emitted from the concentrated perfume in said container externally.

2. A smell emission control apparatus for a television receiver comprising:

transmission means for converting a composite signal in which a video signal and a smell signal are mixed and an audio signal into electrical signals and transmitting the converted electrical signals, said transmission means having a camera, a mike, smell signal generation means, an amplifier and a transmitter, said camera providing the video signal, said mike providing the audio signal, said smell signal generation means providing the smell signal, said amplifier amplifying the audio signal from said mike and the composite signal in which the video signal from said camera and the smell signal from said smell signal generation means are mixed, said transmitter converting the amplified audio and composite signals from said amplifier into the electrical signals and transmitting the converted electrical signals;

reception means for converting the electrical signals transmitted from said transmission means into video, audio and smell signals and outputting the video, audio and smell signals through a Braun tube, a speaker and a corresponding one of a plurality of smell emission devices;

tuning means for receiving the electrical signals transmitted from said transmission means through an antenna and converting the received electrical signals into the audio signal and the composite signal in which the video and smell signals are mixed;

detection means for detecting composite and audio intermediate frequency components from an output of said tuning means to extract the composite and audio signals being placed on composite and audio intermediate frequencies, respectively;

smell signal detection means for detecting the smell signal from the composite signal from said detection means;

infrared-ray signal reception means for receiving an infrared-ray signal from a remote controller and outputting a mode signal corresponding to the received infrared-ray signal;

key matrix means for outputting a mode signal according to a user's selection;

control means, including a microcomputer, for outputting a control signal to perform a mode corresponding to a mode signal from said infrared-ray receiver or from said key matrix unit;

audio signal amplification and output means for amplifying the audio signal from said detection means, wave-shaping the amplified audio signal and outputting the resultant audio signal through the speaker in response to the control signal from said control means;

means for generating and emitting a smell according to the control signal from said microcomputer and from said smell signal detection means;

wherein said smell signal generating and emitting means further comprises:

smell signal processing means responsive to the control signal from said control means for processing the smell signal from said smell signal detection means to output smell select data, smell intensity data, fan drive data and heat drive data necessary to the smell emission, the smell select data indicating a kind of a smell to be emitted, the smell intensity data indicating an intensity of the smell to be emitted, the fan drive data and the heat drive data indicating the time of the smell to be emitted;

smell emission device selection means for selecting one of the plurality of smell emission devices in response to the smell select data from said smell signal processing means;

smell emission device control signal output means for outputting a control signal in response to the smell intensity data from said smell signal processing means to drive the smell emission device selected by said smell emission device selection means;

heat generation means for outputting fan and heat drive signals in response to the fan and heat drive data from said smell signal processing means;

decoding means for decoding the fan and heat drive signals from said heat generation means and outputting the decoded signals to the smell emission device selected by said smell emission device selection means;

each of said smell emission devices emitting a corresponding smell in response to the control signal from said smell emission device control signal output means and the output signals from said decoding means; and wherein said smell signal processing means includes:

a data recognition unit for reading the smell data, the smell intensity data, the fan drive data and the heat drive data from the smell signal from said smell signal detection means in response to a clock from said smell signal detection means, an interface unit for outputting a drive signal in response to the control signal from said control means; and a storage unit for storing the smell select data, the smell intensity data, the fan drive data and the heat drive data from said data recognition unit in response to the drive signal from said interface unit, 3. A smell emission control apparatus for a television receiver comprising:

transmission means for converting a composite signal in which a video signal and a smell signal are mixed and an audio signal into electrical signals and transmitting the converted electrical signals, said transmission means having a camera, a mike, smell signal generation means, an amplifier and a transmitter, said camera providing the video signal, said mike providing the audio signal, said smell signal generation means providing the smell signal, said amplifier amplifying the audio signal from said mike and the composite signal in which the video signal from said camera and the smell signal from said smell signal generation means are mixed, said transmitter converting the amplified audio and composite signals from said amplifier into the electrical signals and transmitting the converted electrical signals;

reception means for converting the electrical signals transmitted from said transmission means into video, audio and smell signals and outputting the video, audio and smell signals through a Braun tube, a speaker and a corresponding one of a plurality of smell emission devices;

tuning means for receiving the electrical signals transmitted from said transmission means through an antenna and converting the received electrical signals into the audio signal and the composite signal in which the video and smell signals are mixed;

detection means for detecting composite and audio intermediate frequency components from an output of said tuning means to extract the composite and audio signals being placed on composite and audio intermediate frequencies, respectively;

smell signal detection means for detecting the smell signal from the composite signal from said detection means;

infrared-ray signal reception means for receiving an infrared-ray signal from a remote controller and outputting a mode signal corresponding to the received infrared-ray signal;

key matrix means for outputting a mode signal according to a user's selection;

control means, including a microcomputer, for outputting a control signal to perform a mode corresponding to a mode signal from said infrared-ray receiver or from said key matrix unit;

audio signal amplification and output means for amplifying the audio signal from said detection means, wave-shaping the amplified audio signal and outputting the resultant audio signal through the speaker in response to the control signal from said control means; and means for generating and emitting a smell according to the control signal from said microcomputer and from said smell signal detection means; and wherein each of said smell emission devices includes:

a container for containing a concentrated perfume therein;

a heat plate disposed under said container, said heat plate heating said container in response to a decoded heat drive signal from a decoding means to allow a smell to be emitted from the concentrated perfume in said container, a suction port disposed at the front of said container, said suction port sucking external air;

a fan disposed between said suction port and said container, said fan blowing the air sucked through said suction port to said container in response to a decoded fan drive signal from the decoding means to allow the smell to be rapidly emitted from the concentrated perfume in said container or remove the emitted smell; and a discharge port disposed at the rear of said container, said discharge port discharging the smell emitted from the concentrated perfume in said container externally.

* * * * *